Patented Dec. 29, 1936

2,066,141

UNITED STATES PATENT OFFICE 2,066,141

FILTRATION OF STARCH CONVERTED SUGAR SOLUTIONS

Charles J. Copland, North Kansas City, Mo., assignor to International Patents Development Company, Wilmington, Del., a corporation of Delaware No Drawing. Application August 14, 1935, Serial No. 36,090

3 Claims. (Cl. 127—55)

This invention relates to the clarification of sugar solutions produced by the conversion of starch in the production of starch sugar or glucose, that is starch syrup; and the object of the invention is to reduce the cost and increase the efficiency of the step of filtering the converted liquor through cloth, as for example in filters of the Sweetland or Vallez type, for the purpose of eliminating fatty matters, gluten residues, and other insoluble impurities.

It has been customary to filter starch converted solutions in bag or cloth or other fine mesh fabric filters after the liquor has been neutralized, and, preferably, after a considerable portion of the impurities have been removed by a centrifuging operation. The bag filtration may be followed by adsorption treatment through bone black; and in effecting the filtration through cloth, it has been customary to use so-called filter aids, such as kieselguhr.

The present invention is based upon the discovery that the cost of the filtration through cloth can be reduced and the efficiency of the filtration increased by using, as a filter aid, corn hulls from the wet process of obtaining starch from corn, for example, the hulls and fibrous material known as coarse slop. This coarse slop may be used either in the form in which it comes from the starch making process or it may be ground.

Assuming the use of a Sweetland or Vallez filter, or other filter equipment employing filter cloth in the form of bags or otherwise, through which the liquid is passed, the preferred method of operation is as follows:

The filter cloth, having been first cleaned, is given a pre-coating of slop from the starch making process, and this pre-coating is effected preferably by mixing a suitable quantity of the slop with, preferably, clarified sugar liquor, and passing the liquor through the filter. It has been found that the pre-coating may be accomplished in a suitable manner by using 2000 gallons of previously filtered liquor and about 75 pounds of dry substance coarse hulls for a filter having 675 square feet of filter cloth. The slop should be added to the liquor in a wet state that is for example, containing about 60% moisture. If introduced into the liquor in a dry state, the liquor will not penetrate and swell the fibres, as is necessary for keeping the filter cake porous, due to osmotic pressure. This mixture is sent through the filter, the slop being deposited on the filter cloth, and dispersed in the cake formed on the cloth which does the actual filtering.

To the liquor to be filtered is added from 30 to 40 pounds dry substance slop per 2700 gallons of liquor. Liquor thus treated is then passed through the filter until the outflow of liquor slows down perceptibly, whereupon the filter is cleaned out and the above described process repeated. The slop after use in the filtering operation can be introduced, along with the rest of the filter cake, into the cattle feed which is one of the usual by-products of the starch manufacture and contains the slop as a constituent; since the corn sugar substances in the filter cake are substantially no different from the hydrol or corn sugar mother liquor that ordinarily also forms a constituent of the cattle feed. The liquor which is first sent through the filter with the relatively heavy charge of slop for effecting the pre-coating of the filter cloth will have to be re-filtered as the filtering operation is not effected until the pre-coating of the filter cloth has taken place.

I claim:

1. The process of clarifying sugar liquors produced through the conversion of corn starch by filtration of said liquors through cloth which comprises: passing the sugar liquor containing slop from the starch making process, in a finely divided state and water soaked, through the filter cloth to pre-coat the same with a filter cake; and then passing through the filter cake and cloth the solution to be clarified into which slop of the character above specified has been mixed.

2. The process of clarifying sugar liquors produced through the conversion of corn starch by filtration of said liquors through cloth which comprises: passing the sugar liquor containing a reltively large quantity of slop from the starch making process, in a finely divided state and water soaked, through the filter cloth to pre-coat the same with a filter cake; and then passing through the filter cake and cloth the solution to be clarified into which a smaller quantity, per unit of volume, of slop of the character above specified has been mixed.

3. The process of clarifying sugar liquors produced through the conversion of corn starch by filtration of said liquors through cloth which comprises: passing the sugar liquor containing slop from the starch making process, in a finely divided state and water soaked, in the proportion of approximately 75 pounds of dry substance slop to 2,000 gallons of liquor, through the filter cloth to precoat the same with a filter cake; and then passing through the filter cake and cloth the solution to be clarified into which slop of the character above specified has been mixed in the proportion of approximately 30 to 40 pounds dry substance slop to 2,700 gallons of liquor.

CHARLES J. COPLAND.